Figure 1:
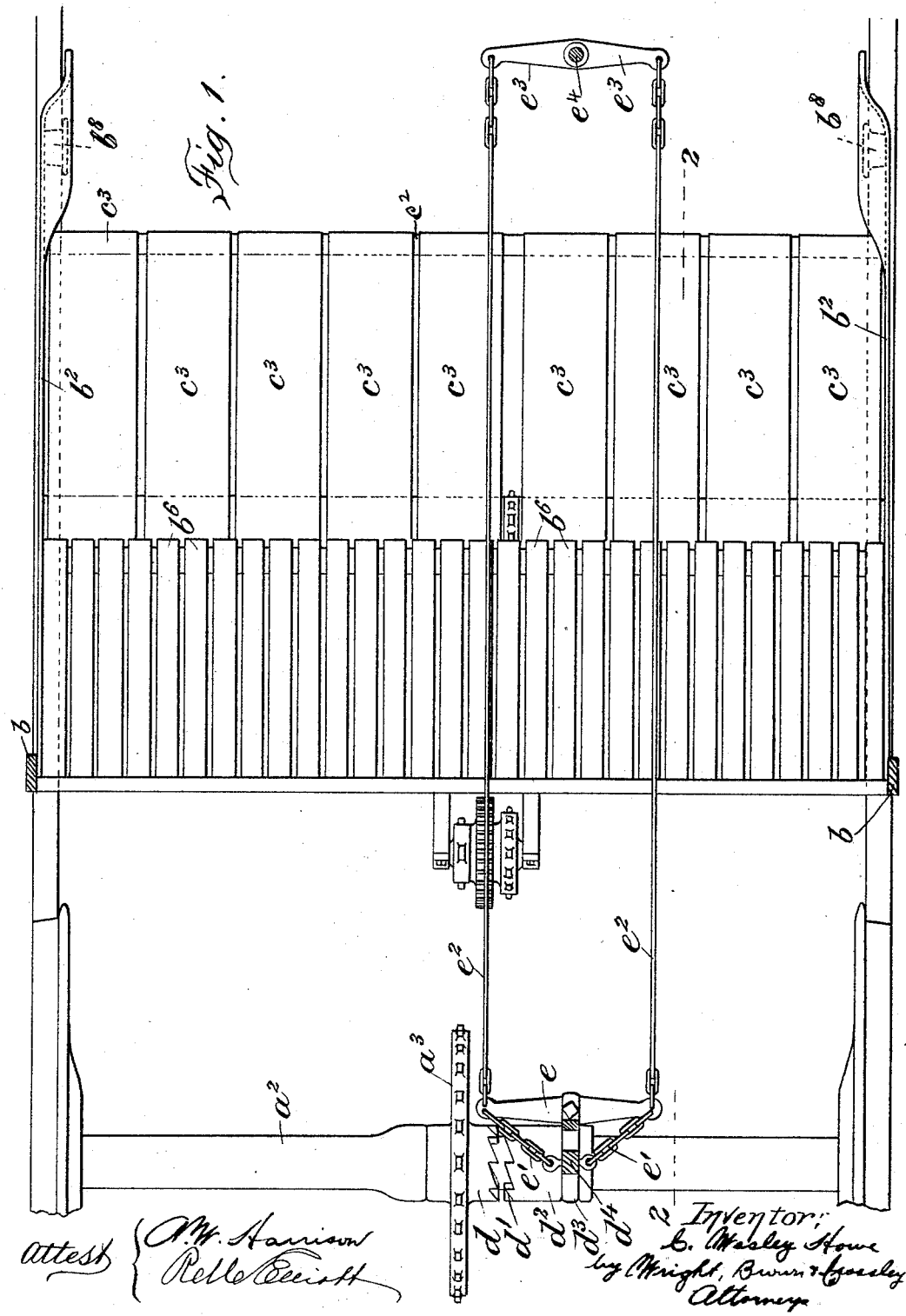

(No Model.) 2 Sheets—Sheet 2.

C. W. HOWE.
WHEEL FENDER.

No. 498,010. Patented May 23, 1893.

Attest:
N. W. Harrison
Pell Everett

Inventor:
C. Wesley Howe
by Wright, Brown & Quimby
Attorneys

UNITED STATES PATENT OFFICE.

CHARLES WESLEY HOWE, OF WALTHAM, MASSACHUSETTS.

WHEEL-FENDER.

SPECIFICATION forming part of Letters Patent No. 498,010, dated May 23, 1893.

Application filed August 15, 1892. Serial No. 443,155. (No model.)

*To all whom it may concern:*

Be it known that I, CHARLES WESLEY HOWE, of Waltham, in the county of Middlesex and State of Massachusetts, have invented certain new and useful Improvements in Wheel-Fenders, of which the following is a specification.

My invention relates to wheel fenders or life guards for cars, or other vehicles, and has particular reference to that class of wheel fenders by means of which a person who is struck by a moving vehicle is received in a suitable receptacle which may be called a crib or lodge, and is carried by the said vehicle, (or is laid outside.)

The object of my invention is to provide means, whereby a human being, or any object that might either be injured by the vehicle, or prove an obstruction to it, and that is in the path of movement of said vehicle, will be displaced from said path of movement, and carried along, or laid outside, by said vehicle without injury. And the special object of my invention is to pick up or lift from the closest proximity to the ground or track, any such person or object that is to be removed, such as a small child lying in front of the vehicle.

To this end, my invention consists in the construction and combination of parts as hereinafter described and claimed.

In the drawings which accompany and form part of this specification, I have illustrated one form of mechanism for carrying my invention into practice, but it is to be understood, that I do not limit myself to the details shown therein.

Figure 2:
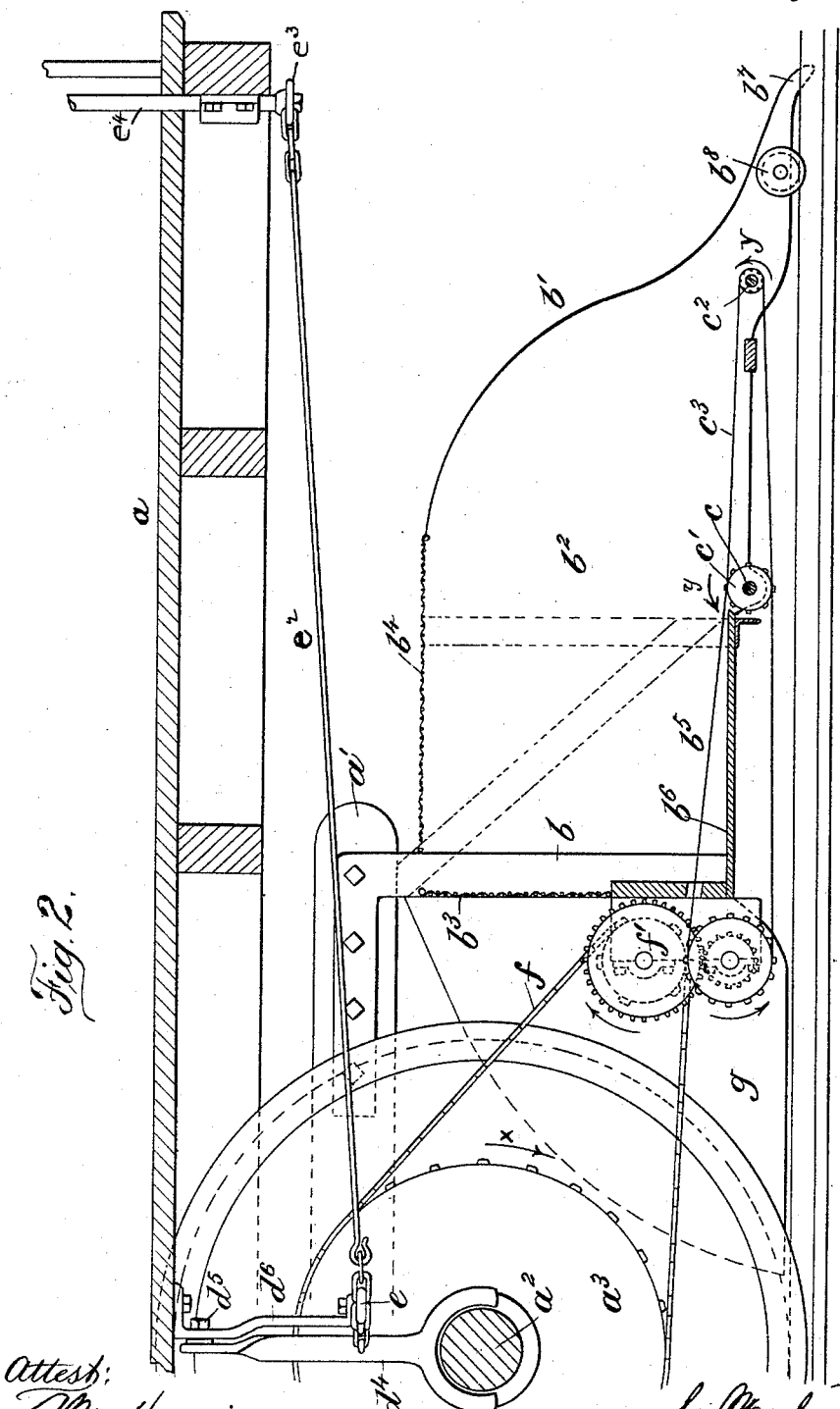

In the drawings—Figure 1 illustrates my invention in plan view, some parts being shown in section, and showing a connection with one of the car axles for operating the movable or lifting surface, here shown as a series of endless belts. Fig. 2 is a section on line 2—2 of Fig. 1, and indicates also a preferred position of the fender or life guard relative to the front platform and wheels of a car.

Similar reference letters indicate similar parts in both views.

$a$ indicates a portion of the floor of a car, supported by wheel trucks, a portion of the front truck frame being shown at $a'$, and the front axle at $a^2$. The parts so far described are or may be of the usual construction.

The wheel fender or life guard is composed of the following parts. By means of brackets $b$ secured to the truck frame I support a receptacle or crib $b'$, having sides $b^2$, rear $b^3$, a partial top $b^4$, and a bottom or floor $b^5$, the portion of which nearest the back is preferably constructed in grid form; that is, of a series of slats $b^6$, suitably supported by the frame of the crib, and constructed and arranged to cushion a blow, as from a falling body, and having spaces between them of such width as to readily permit the passage of snow or rain water. The sides $b^2$ extend forward and at their ends are provided with rounded points $b^7$ adapted to extend down below the tread of the rails and inside thereof to prevent any small object on the rails from getting under the outward corner of the crib, and to lift the obstacle into the crib or lay it outside the car; these sides $b^2$ carry small wheels $b^8$ adapted to rest on the treads of the rails and prevent the points $b^7$ from becoming bent by contact with the end of a rail at a joint or a switch. The sides are bent over the tops of the wheels $b^8$ to form guards therefor. Close to the front end of the slats $b^6$ is a shaft $c$ having bearings in the sides $b^2$ and a sprocket wheel $c'$, and in suitable bearings also in the sides $b^8$ and near the points $b^7$, is a small shaft $c^2$. Over the two shafts are stretched belts or aprons $c^3$, which however, might be a single apron instead of a series. On the axle $a^2$ is loosely mounted a sprocket wheel $a^3$ on the hub of which is formed one part $d$ of a clutch; the other part $d'$ of which is formed on a sleeve $d^2$ splined to the axle $a^2$, and having an annular groove $d^3$, which receives the bifurcated end of an arm $d^4$ pivoted at $d^5$ to a bracket $d^6$ depending from the car floor. To the lower end of this bracket is pivoted at its center a bar $e$ to the ends of which chains $e'$ from the arm $d^4$ are connected, and to the ends of which are also connected rods or links $e^2$ extending forward and connected to the ends of an arm $e^3$ which, at its center, is rigidly secured to the lower end of a post or shaft $e^4$ which extends up through the car platform and is provided at its upper end with any suitable means (not shown) for turning it and causing, through the connections shown and described, to connect or disconnect the clutch.

The sprocket wheel $a^3$ is connected by a chain $f$ with any suitable multiplying gearing $f'$ from which power is transmitted to the sprocket $c'$. As shown in the drawings, the connections are such that when the car is moving forward and the wheels thereof rotating in the direction of the arrow $x$, the shaft $c^2$ will be rotated in the direction of the arrow $y$, at a high rate of speed, whenever the clutch is in gear, and the front of the shaft $c^2$ moves upwardly and serves to lift a body or other obstruction from the path of movement of the vehicle, so that the crib enters under said body which will then be carried back and received on the cushioning slats $b^6$.

Many changes may be made in the details, proportions and arrangement of the parts without departing from the spirit of my invention. For instance, the belts $c^3$ might be omitted, the slats extended directly to the shaft $c^2$ and the rotative power applied directly to said shaft $c^2$, the front of which acts chiefly to lift an obstruction as described.

In Fig. 2 I indicate guards $g$ extending from the sides $b^2$ backward and extending outside the front of the wheels.

Having thus described the nature of my invention and explained a means for carrying it into effect, although without attempting to set forth all of the forms in which it may be embodied or all of the modes of its employment, I declare that what I claim is—

1. In a wheel fender, the combination with a receptacle or crib, of a rotary shaft at the front thereof, another shaft parallel thereto, an endless belt or apron carried by said shafts, and connections operated by the movement of the vehicle for moving said shafts and apron, substantially as described.

2. In a wheel fender, the combination with a receptacle or crib, of a rotary shaft at the front thereof, another shaft parallel thereto, an endless belt or apron carried by said shafts, and connections operated by the movement of the vehicle for moving said shafts and apron, and a clutch for connecting or disconnecting the operating mechanism.

In testimony whereof I have signed my name to this specification, in the presence of two subscribing witnesses, this 13th day of August, A. D. 1892.

C. WESLEY HOWE.

Witnesses:
A. W. HARRISON,
ARTHUR W. CROSSLEY.